July 14, 1931.  H. J. BREEZE  1,813,986
TAKE-OFF AND LANDING APPARATUS FOR AIRPLANES
Filed Aug. 12, 1929  4 Sheets-Sheet 1
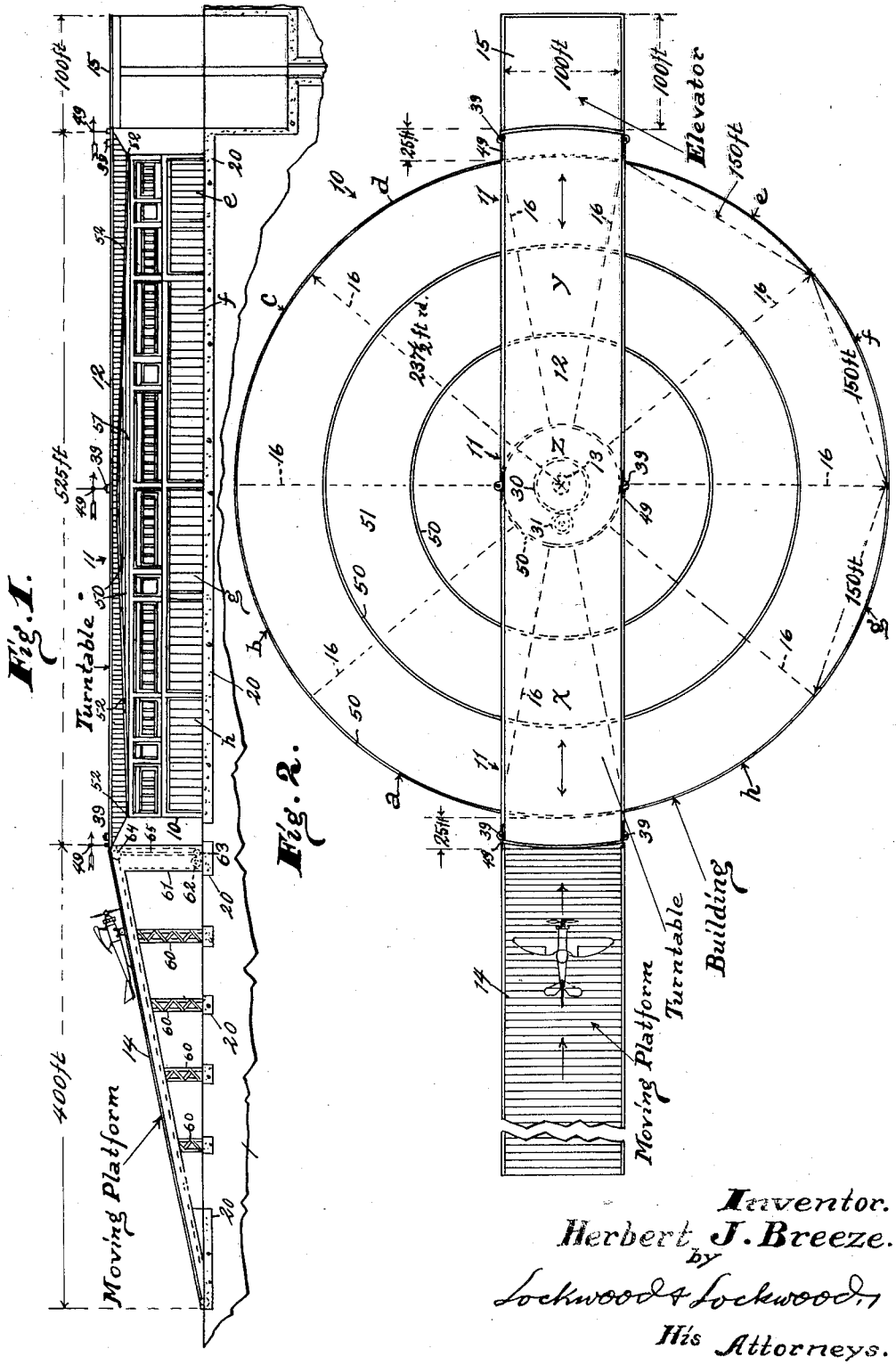
Inventor.
Herbert J. Breeze.
by
Lockwood & Lockwood,
His Attorneys.

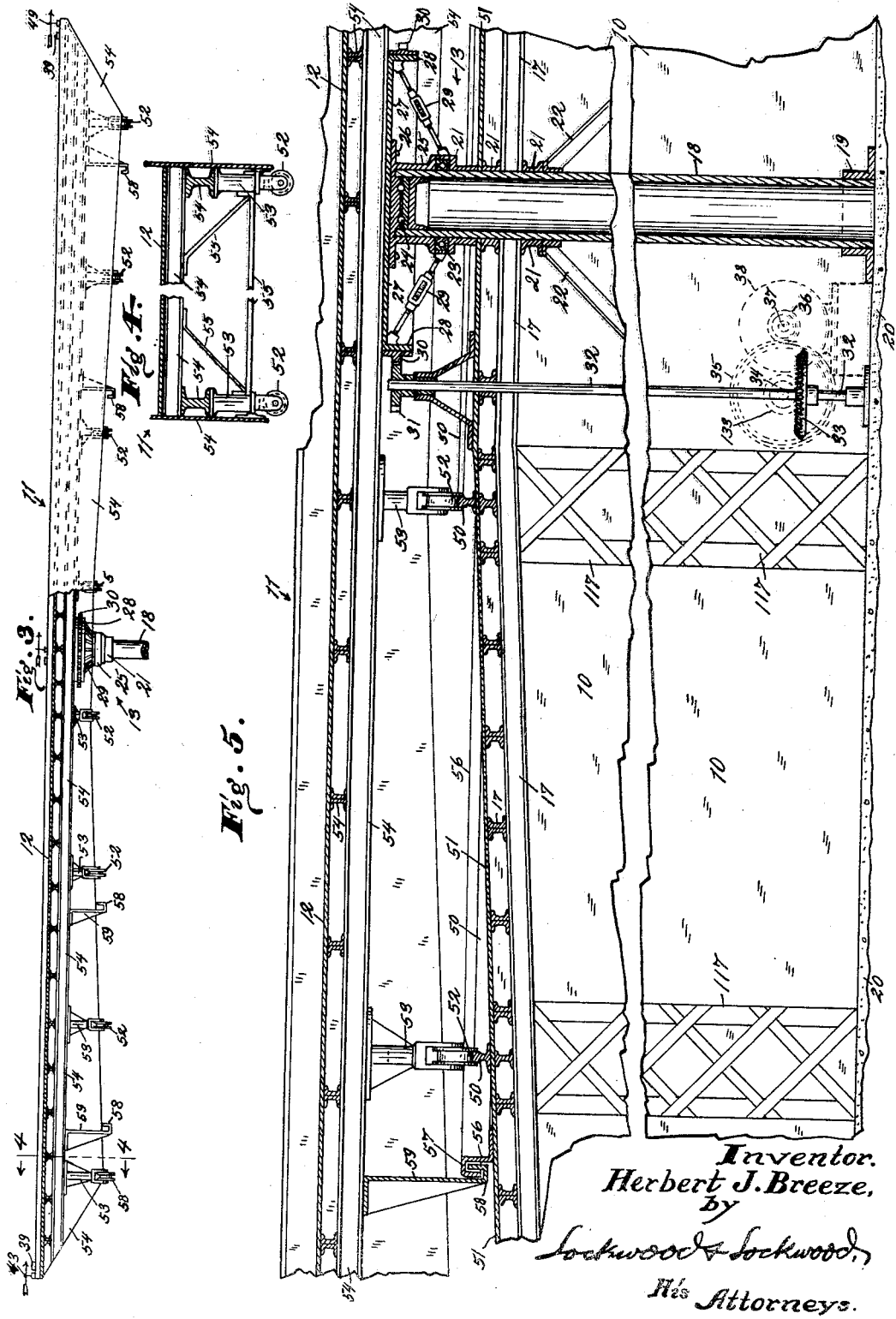

July 14, 1931.  H. J. BREEZE  1,813,986
TAKE-OFF AND LANDING APPARATUS FOR AIRPLANES
Filed Aug. 12, 1929  4 Sheets-Sheet 3
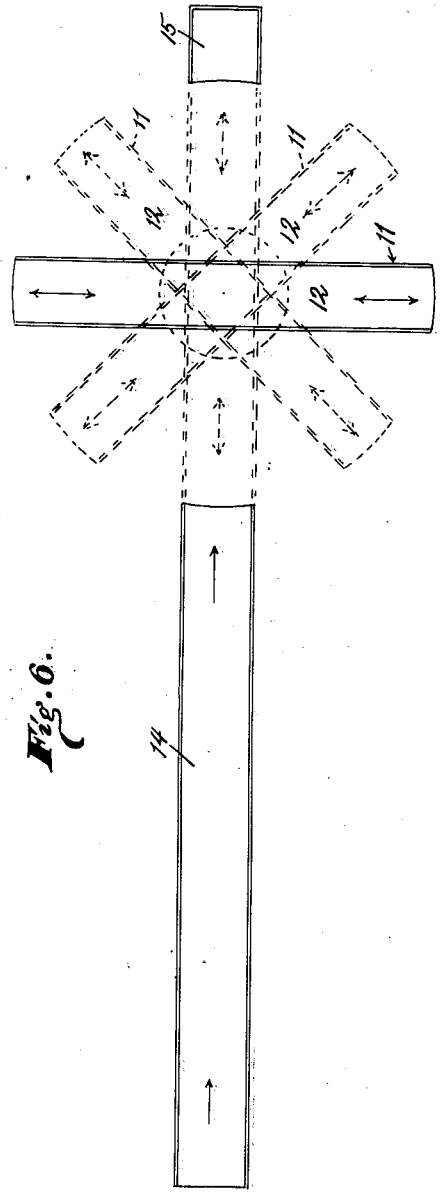
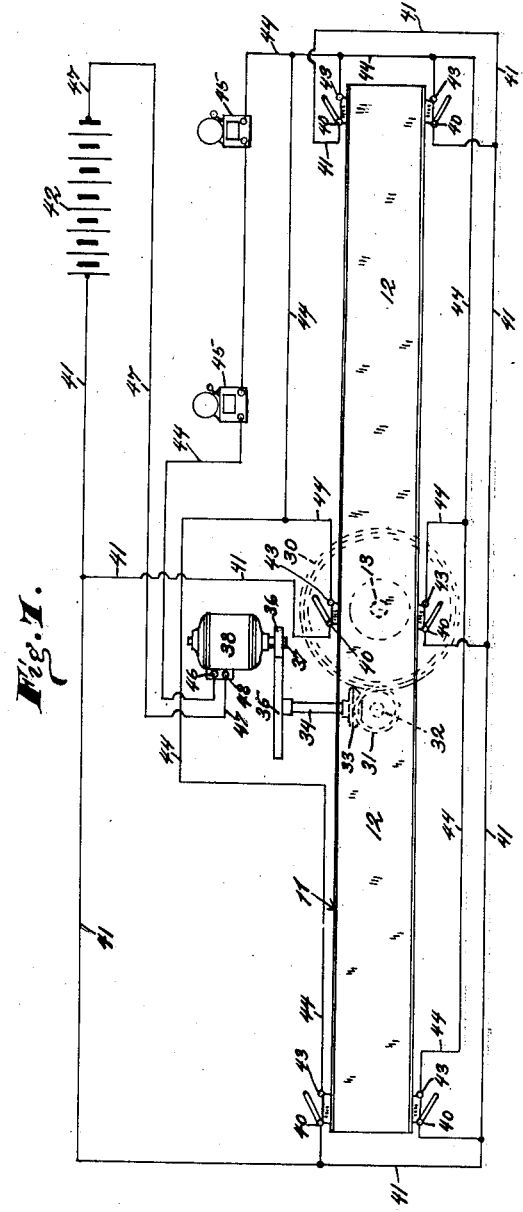
Inventor
Herbert J. Breeze
by
Lockwood & Lockwood
His Attorneys.

July 14, 1931.  H. J. BREEZE  1,813,986
TAKE-OFF AND LANDING APPARATUS FOR AIRPLANES
Filed Aug. 12, 1929    4 Sheets-Sheet 4
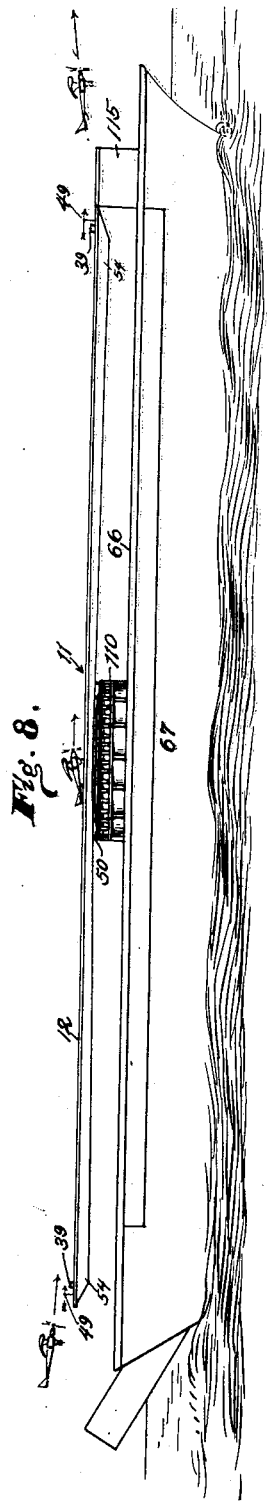
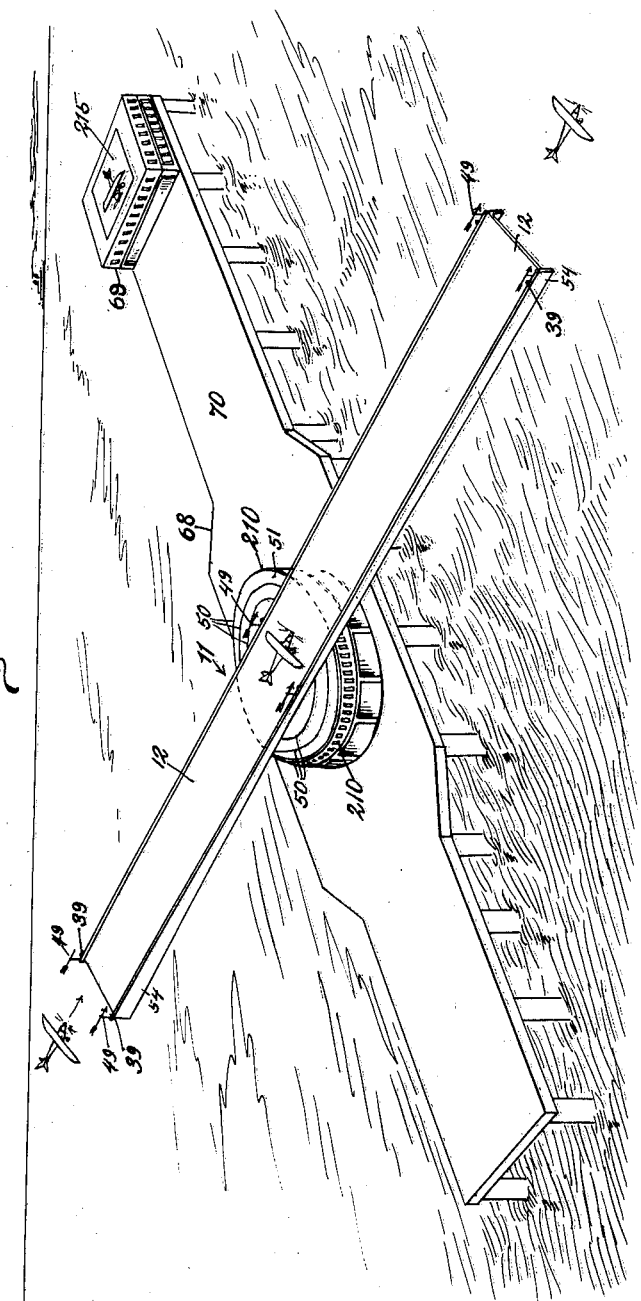
Inventor.
Herbert J. Breeze.
by
Lockwood & Lockwood,
His Attorneys.

Patented July 14, 1931

1,813,986

UNITED STATES PATENT OFFICE

HERBERT J. BREEZE, OF CHATSWORTH, CALIFORNIA

TAKE OFF AND LANDING APPARATUS FOR AIRPLANES

Application filed August 12, 1929. Serial No. 385,275.

This invention relates to a take-off and landing apparatus for use of airplanes and the like, and the principal object is to provide an elongated runway from which the airplanes can safely and easily take flight or land with means associated therewith for moving it in an arc so as to direct its course toward the direction from which the wind is blowing so that the airplanes can more easily take to the air in starting on a flight or land safely in terminating one.

In the art of flying it has been found not only advantageous but necessary to drive a heavily loaded airplane directly toward the wind in order to safely rise in the air in starting a flight, and for that reason attempts have been made to arrange the take-off courses of airports so they face the general direction from which the winds are most constant; but unfortunately the directions from which the wind blows are greatly changeable so that such fixed courses are of use only when the direction of the wind is favorable. When the wind is crosswise to a fixed course it is very hazardous to the pilot and passengers of a heavily loaded airplane to attempt to take flight and also it is most difficult and sometimes impossible for such an airplane to take the air, and such attempts at flight have often resulted disastrously. Such a condition is a great hindrance to flights on a scheduled time, and an object of this invention is to provide a simple means whereby an airplane can start on a scheduled time regardless as to what direction the wind is blowing.

To that end I provide a runway that can be turned in any arc of a complete circle to direct its course directly into the wind so that any time of day or night heavily loaded planes can easily and safely start on their flight or, on arriving at the airport, can also land safely.

Another object of the invention is to provide a simple and efficient means for getting a heavily loaded airplane a sufficient distance up in the air at its start to maintain its equilibrium and proceed on its course. To that end I provide a runway that is of great length and supported at a considerable elevation so that airplanes can obtain speed before leaving the course, and after leaving it are at a sufficient elevation and with a sufficient volume of air underneath to safely support them so that their take-off can be easily and safely consummated; and in connection with this elevated runway I supply a power operated moving platform for transporting the airplanes from the ground to the runway, and I also provide an elevator that can be used for that purpose.

While I especially describe my runway as for use with airports on land it is understood that it can be of equal use on floating air-ports, battleships and the like.

A feature of invention is shown in mounting my runway on the top of a large building so that the latter is not only of great use in supporting the runway and housing its operating means, but also the building can be of great use in housing and centralizing the manufacturing industries, trades and people interested in the art of aerial navigation.

Another feature of invention is shown for driving the runway and controlling it by electrical means operable on the runway course.

Other objects, advantages and features of invention may appear from the accompanying drawings, the subjoined detailed description and the appended claims.

The accompanying drawings illustrate the invention.

Fig. 1 is a semi-diagrammatic side view of an airport with a take-off and landing apparatus for airplanes that is constructed in accordance with this invention, showing an airplane being transported by the moving platform from the ground to the runway.

Fig. 2 is a fragmental plan view of the airport shown in Fig. 1, parts being omitted for the sake of clearness in the drawings; and indicating by radially extending dotted lines several compartments of the building that can be utilized for manufacturing and storage purposes.

Fig. 3 is a semi-diagrammatic fragmental side view of the runway detached from the building, parts shown in section.

Fig. 4 is a fragmental cross section on line 4—4, Fig. 3.

Fig. 5 is an enlarged fragmental central vertical section through a center portion of the building showing in detail the means for mounting and driving the runway, part of the driving means being indicated by dotted lines.

Fig. 6 is a diagrammatic view of the runway turned to a right angle position relative to its associated moving platform and elevator, and indicating by dotted lines the various positions to which the runway can be turned to direct its course into the wind.

Fig. 7 is a diagrammatic plan view of the runway and means for turning it in an arc, also showing a diagram of the electrical wiring.

Fig. 8 is a semidiagrammatic view of the runway mounted on a center dome of a battleship showing airplanes landing on, running over and taking off from the runway; also diagrammatically showing an elevator at one end of the battleship for transporting the airplanes to or from the runway.

Fig. 9 is a semi-diagrammatic perspective view of a floating airport provided with my runway mounted on a center building, also indicating an elevator building at one end of the airport for transporting the airplanes from the deck of the floating airport to the runway; also showing airplanes landing on, running over and taking off from the runway.

The invention includes a building 10 above which a runway 11 is supported and pivotally mounted so it can be turned in an arc and in any direction to direct its course 12 into the wind blowing toward the axis of the runway pivot 13; and associated with this runway is an inclined moving platform 14 for transferring airplanes to and from the runway 11, and also I provide an elevator 15 that is arranged opposite to the platform 14 that can be used for the same purpose.

The building 10 can be constructed of any suitable material and built to any height, size and form. For the purpose of illustration I show a circular building that from its center to circumference is about two hundred thirty seven and one-half feet, it being understood that it can be more or less as may be desired; and preferably I form the building of that size so that its first floor space can be divided up by radial walls 16 so as to form eight large rooms with an entrance to each of not less than a hundred and fifty feet so that in the event the rooms are used either for the manufacture or storage airplanes of very great size can be built or housed therein.

As indicated in Fig. 2, these large rooms a, b, c, d and e, f, g, h are arranged on opposite sides of smaller rooms x, y and z that are arranged between the moving platform 14 and elevator 15, the center circular room z being utilized for the means for actuating the runway, keeping it in repair and other work associated with the airport.

The purpose of the building, aside from supporting the runway, is to provide room for centralizing the various manufacturing industries and business associated both directly and indirectly with aerial transportation. In other words I propose constructing the building 10 of sufficient size to house several of the large industries that are engaged in the manufacture of airplanes and the like; and also providing room to house and feed the people employed. In other words the building can be provided with room for hotels, restaurants and stations for the working and traveling public, and for that reason I propose constructing the building two or more stories.

The building 10 has an inclined roof 51 supported by the frame 17 that can be constructed and arranged in any well known way and this frame includes the supports 117, as indicated in Fig. 2. In the center of the building I provide a runway pivot 13 that includes a stationary hollow column 18 secured in a base 19 that can be secured to a cement foundation 20 indicated in Figs. 1 and 5.

The upper end of the column 18 is secured to the frame 17 by supports and braces 21 and 22 and it carries the ball-bearings 23 and 24 that are interposed between the column 18 and hub 25 that is secured by rivets 26 to the web 27 of the runway wheel 28. The rim of the wheel 28 is connected by the turnbuckles 29 to the lower end of the hub 25 so as to form a very secure substantial structure capable of supporting the center portion of the runway.

The rim of the wheel 28 carries a spur gear 30 that is driven by a small gear 31 on the shaft 32, and the shaft is driven by a bevel gear 33 that is secured to the shaft 32 in position to be engaged by another bevel gear 133 on a shaft 34. The shaft 34 carries a large spur gear 35 that meshes with a small driving gear 36 on a shaft 37 of the motor 38. This driving connection between the shaft 32 and motor 38 is shown by dotted lines in Fig. 5 and also shown diagrammatically in Fig. 7. The driving connection between the motor 38 and shaft 32 is old in the art and for that reason is not shown or described in complete detail.

In Fig. 7 I show the motor connected by suitable wiring to switches 39 that are carried by the runway so that the motor can be started by any one of these switches to turn the runway to a desired position. These switches 39 are preferably arranged adjacent the ends and at the center of the runway and they are arranged so that normally they are out of circuit. Each switch has a contact 40 that is connected by a wire 41 with one side of a source of electrical power indicated by the battery 42; and the other contact 43 of each switch is connected by wires 44 that pass through the bells 45 to a contact 46 on the motor, then a wire 47 connected to a contact 48 is extended from the motor to the other side of the battery so that when any one of the switches is actuated the motor will be started to drive the train of gears and move the runway in an arc.

In using my runway at night it is understood that its course will be properly lighted.

The purpose of the bells in the electrical wiring is to warn persons that the runway is to be started, it being understood that the train of gears interposed between the motor and runway is for the purpose of moving the latter at a very slow speed so that the bells ring slightly in advance of any perceptible movement of the runway so that persons in dangerous positions can move to safe positions. The warning bells can be arranged to various places around the building 10 and runway 11 so that persons can be warned to move to places of safety when a switch is actuated to start the motor.

I also provide weather vanes 49 in the form of staff supported arrows connected to the runway and preferably arranged adjacent the ends and center of the runway to indicate the direction from which the wind is blowing so that an operator on the runway can turn it into proper position for an airplane to take off in the face of the wind.

I provide means for supporting the weight of the runway which includes four endless circular tracks 50 secured to the roof 51 of the building and engaging these tracks are eight pairs of wheels 52 that are connected to the underside of the runway, as best indicated in Figs. 3, 4 and 5. The tracks 50 and wheels 52 are spaced so as to distribute the weight of the long runway 11 over the roof of the building. The supporting wheels and tracks are shown semi-diagrammatically and greatly out of proportion to the runway to illustrate their purpose. It is understood that in practice such parts will be made in proper proportion with the wheels provided with the usual ball bearings and properly mounted in hangers 53.

The hangers 53 are secured to the frame 54 of the runway and are secured in place by cross braces 55, as shown in Fig. 4.

I also provide guides 56 for the runway that are secured to the roof of the building and these guides have hooked flanges 57 that loosely extend into similar hooks 58 on hangers 59 extending downward from the runway 11.

The hooks are engaged only when the runway is thrown out of balance as by the wind, at which time the hooks of the hangers engage the hooks of the guide and prevent displacement of the runway from the tracks. The hooks are sufficiently loose to permit the runway to be freely turned when necessary.

The elevators 15—215 are old in the art and are therefore not shown and described in detail. Also the runway 14 is old. In Figs. 1 and 2 it is shown arranged opposite to the elevator 15, and in the former figure it is shown supported on the supports 60 and a tower 61 and in the latter the operating means can be located. As indicated by dotted lines, the operating means can be a motor 62, driving the sprocket wheels and chain 63, 64 and 65. It is understood that I may employ any well known means for actuating the platform 14.

In Fig. 8 I show my runway 11 mounted on a building 110 arranged centrally on the upper deck 66 of a ship 67 that is diagrammatically shown in the drawings, and I also diagrammatically indicate an elevator 115 at one end of the ship by which passengers, airplanes and cargo can be elevated to the runway from the deck. The ship 67 can be for either defensive or commercial use.

In Fig. 9 I show my runway mounted on a building 210 arranged centrally on a floating airport 68 that has an elevator building 69 arranged at one end thereof with an elevator 215 arranged therein whereby airplanes, passengers and cargo can be elevated from the deck 70 to the runway 11. It is understood that I employ means similar to that shown in Fig. 5 for operating the runways shown in Figs. 8 and 9.

In use the airplanes are moved to the runway either by the elevators diagrammatically shown in the various figures of the drawings, or by the moving platform shown in Figs. 1 and 2. Then the runway is moved in an arc when necessary to direct its course directly into the wind so that the airplanes in taking off can run directly toward the wind.

The runway is of sufficient length and level and lies in a horizontal position so that the airplanes starting from one end thereof and running against the wind will develop sufficient speed to take to the air before they have completely covered the course.

The runway is elevated so that even heavily loaded airplanes will take readily to the air when driven over the runway directly against the wind, and it is obvious that the runway can be turned to face the wind for the foregoing purposes. By means of my runway movable to all positions in a circle so as to benefit with the lifting force of the wind it is also obvious that airplanes can take off from the runway or land on it on scheduled time, and also start or terminate their flights easily and safely to their pilots, passengers and cargo.

I claim as my invention:

1. A take-off and landing apparatus for airplanes including a support in the form of a building, an elevated runway pivotally mounted on said support, an inclined moving platform for transferring airplanes from the ground to said runway, and means for turning said runway in an arc so that the airplanes thereon can be faced in the direction from which the wind is blowing.

2. A take-off and landing apparatus for airplanes including a building arranged to form a support, an elevated runway having a course arranged horizontally thereon, a pivotal connection between said runway and building, circular tracks on said building, wheels supported under said runway that are arranged to engage said tracks so as to support the weight of said runway, an inclined moving platform adjacent said building for transferring airplanes from the ground to said runway, guiding connections between said runway and building, and means for turning said runway in an arc for the purpose specified.

3. In a take-off and landing apparatus for airplanes, the combination of a building arranged to form a support and having compartments therein for the accommodation of manufacturing industries and persons associated with aerial navigation, a runway pivotally mounted on said building and arranged to be moved in an arc, an inclined moving platform for transferring airplanes from the ground to said runway, and an elevator arranged adjacent to said building and opposite said platform for the purpose specified.

4. In a take-off and landing apparatus for airplanes, the combination with a building arranged to form a support and having compartments therein for the accommodation of manufacturing industries and persons associated with aerial navigation so as to centralize the industries and people connected therewith, of an elevated runway pivotally mounted above said building, circular endless tracks on said building, pairs of wheels on said tracks for supporting said runway, means for transferring airplanes and people to and from said runway, and means operable from said runway for moving it in an arc for the purpose specified.

5. In a take-off and landing apparatus for airplanes, the combination with a building arranged so as to form a support, of a runway, a pivotal connection between said runway and building, tracks secured to said building, pairs of wheels secured to said runway so as to engage said tracks to support said runway, a spur gear secured to said runway that is arranged above and central to said pivotal connection, a motor, a driving connection between said motor and spur gear and means operable from said runway for starting and stopping said motor.

6. In a take-off and landing apparatus for airplanes, the combination with a building having rooms for the manufacture and storage of airplanes and arranged so as to form a support, a runway above said building, a pivotal connection between said runway and building including a hollow column arranged centrally in said building, endless tracks secured to said building, pairs of wheels secured to said runway to engage said tracks so as to support said runway, guides secured to said runway and building so as to stabilize said runway, a spur gear secured to said runway that is arranged above and central to said pivotal connection, a motor, a driving connection between said motor and spur gear, and electrical means carried by said runway for starting and stopping said motor that is operable from said runway.

In witness whereof, I have hereunto affixed my signature.

HERBERT J. BREEZE.